Patented Jan. 5, 1954

2,665,209

UNITED STATES PATENT OFFICE 2,665,209

NONCAKING FEED SUPPLEMENT

John W. Brodhacker, United States Navy, assignor to Commercial Solvents Corporation, Terre Haute, Ind., a corporation of Maryland No Drawing. Application July 31, 1951,
Serial No. 239,639

9 Claims. (Cl. 99—9)

My invention relates to feed supplements consisting of dried fermentation residues and more particularly it relates to the prevention of caking in such feeds.

It is known that fermentation liquors containing various vitamin products, such as riboflavin, can be evaporated, to produce dried fermentation residues containing the vitamins in a form suitable for use as a feed supplement in feeds for animals and poultry. Stiles United States Patent 2,483,855 discloses a process for the production of riboflavin by the fermentation of nutrient media and also describes the production of a feed supplement such as that mentioned above by drying the fermentation liquors resulting from the fermentation process using the organism *Eremothecium ashbyii* which dried residues contain riboflavin in amounts from about 200–2,000 micrograms per gram of dried material. Miner United States Patent 2,202,161 discloses similar feed supplements resulting from fermentation of nutrient media utilizing butyl alcohol-producing bacteria such as *Clostridium acetobutylicum*. Such dried fermentation residues are secured by concentrating the fermentation liquor by evaporation followed by drying of the resulting concentrate using rotary drum driers, vacuum driers, spray driers or the like.

The feed supplements which are produced by drying the fermentation liquors resulting from fermentation of nutrient media utilizing organisms such as *Eremothecium ashbyii*, *Clostridium acetobutylicum*, etc. are used extensively by feed producers in compounding balanced rations containing adequate amounts of vitamins, minerals, proteins, etc. The dried fermentation residues such as those produced by Stiles U. S. Patent 2,483,855 and Miner U. S. Patent 2,202,161 however, have a very serious tendency to cake upon storage, and this leads to considerable difficulty on the part of feed manufacturers because of the necessity for breaking up and pulverizing the caked feed supplement before it can be added to the feed being produced. In addition, such caking often results in the complete loss of the material due to destruction of the vitamins contained in the dried residues or to the lack of equipment with which the caked material can be properly broken up into a form suitable for mixing with the other ingredients of the feed.

I have now discovered that the caking tendency in dried fermentation residues resulting from the fermentation of nutrient media utilizing organisms such as *Eremothecium ashbyii*, *Clostridium acetobutylicum*, etc. can be prevented economically and effectively and therefore I am able to provide a feed supplement which can be safely stored for a considerable period of time without danger of the material caking and thereby becoming useless or at least unfit for use without additional labor and equipment to render it free-flowing.

My invention consists of the addition of formaldehyde and either an alkali metal hydroxide or an alkaline earth metal hydroxide to fermentation liquors from which a considerable portion of the water has been evaporated but which have not been finally dried to produce the dried fermentation residue. After the addition of the formaldehyde and the base, the fermentation liquor concentrate is further dried to produce dried fermentation residues which will not cake upon storage, which retain their feed supplement properties, and which are non-toxic to animals or poultry.

The caking of dried fermentation residues from fermentation liquors resulting from the culture of the organism *Eremothecium ashbyii* on nutrient media has been associated with dark color. I have found that a color scale can be used as a measure of the degree of caking of vitamin-containing fermentation residues. In addition, I have found that an accelerated caking test can be made by heating a small jar of the ground dried fermentation solubles in an oven at a temperature of about 65° C. for a period of about 16 hours. Samples that cake badly in this test develop a dark color, and the degree of darkness represents the degree of caking.

I have devised a color scale that matches the color of ground, dried fermentation residues produced by evaporating and drying fermentation liquors resulting from the fermentation of nutrient media consisting of milk solids and malted grain utilizing the organism *Eremothecium ashbyii*. The colors for use in the color scale were made from two basic colors which I have denoted color A and color B. Color A consists of one part Burnt Umber artists' oil and nine parts of clear varnish. Color B consists of one part Yellow Ochre artists' oil and nine parts of clear varnish. From combination of colors A and B, the color scale is as shown in the following table:

TABLE I

*Color scale for measurement of caking*

| Color No. | Parts of color A | Parts of color B |
|---|---|---|
| 0 | 0 | 100 |
| 1 | 20 | 80 |
| 2 | 30 | 70 |
| 3 | 40 | 60 |
| 4 | 50 | 50 |
| 5 | 60 | 40 |
| 6 | 70 | 30 |
| 7 | 80 | 20 |
| 8 | 90 | 10 |
| 9 | 100 | 0 |

The ten colors obtained in the manner indicated above all can be painted on panels or fixed in any other convenient manner for use as a color comparison scale. Color number 0 is the lightest color and color number 9 is the darkest. Upon comparing samples of dried fermentation residues heat treated as described above, a sample having a color of 3 or 4 will not have caked unduly while a color of 5 to 9 indicates that the sample has caked substantially. Such latter materials will cake badly on storage and bring about the difficulties mentioned above.

The composition of my invention is produced by first evaporating the fermentation liquors to a solids content of about 30%, adding the formaldehyde and hydroxide, and then drying the syrup by any convenient means such as by the use of rotary drum driers, vacuum driers, spray driers, etc. The dried material is then ground to a fine powder and this powdered material is the non-caking feed supplement. Any convenient aqueous formaldehyde solution can be employed for the addition of the formaldehyde to the material, however, a 37% aqueous solution is the most readily available and therefore I prefer to use a solution of this concentration. The amount of 37% formaldehyde solution which I add ranges from about 1 to about 5 parts of the solution per 100 parts of partially evaporated fermentation liquor syrup. I prefer to add about 2 parts of the formaldehyde solution to 100 parts of the partially evaporated fermentation liquor syrup since this amount is adequate to prevent caking for a considerable period of time. In adding the alkali metal or alkaline earth metal hydroxide to the partially evaporated fermentation liquor syrup, I add an amount sufficient to adjust the pH to a value between about 3.5 and 6.5, preferably about 5.5. The pH of the partially evaporated fermentation liquor syrup is usually about 3.0 prior to the addition of the hydroxide and I have found that an adjustment of the pH within the limits prescribed is sufficient to substantially prevent caking.

A number of caking tests were carried out wherein untreated feed supplements were compared with supplements treated with formaldehyde and an alkali metal or an alkaline earth metal hydroxide, these materials being added after the fermentation liquors resulting from the culture of the organism *Eremothecium ashbyii* were evaporated to a 30% solids content and prior to the final drying and grinding steps. In each test a tightly sealed four ounce jar, filled about half full with the sample to be tested, was placed in an oven at 65° C. The jar was allowed to remain in the oven for 16 hours following which it was removed and allowed to cool. The degree of caking was then determined by matching the color of the sample with the color chart prepared as described above. In each case, where the samples were treated with formaldehyde and a hydroxide of an alkali or alkaline earth metal, the reagents were mixed with the syrup as quickly as possible so that a minumum of the growth promoting substances contained therein would be destroyed by a localized excessive concentration of the additives. The following table gives the results of the experiment:

TABLE II

*Caking of treated and untreated feed supplements*

| Lot No. | Additives per 100 grams of drier syrup | Color after heat | Caking |
|---|---|---|---|
| 1 | None | 4 | Yes. |
|   | 2.0 ml. 37% HCHO plus 0.7 g. NaOH | 2 | No. |
|   | 4.0 ml. 37% HCHO plus 0.7 g. NaOH | 2 | No. |
| 2 | None | 5 | Severe. |
|   | 4 ml. 37% HCHO plus 0.7 g. Ca(OH)₂ | 3 | Slight. |
| 3 | None | 5 | Severe. |
|   | 2 ml. 37% HCHO plus 0.7 g. NaOH | 3 | Slight. |
|   | 2 ml. 37% HCHO plus 0.7 g. Ca(OH)₂ | 3 | Do. |
| 4 | 4 ml. 37% HCHO plus NaOH to pH 4.6 | 4 | Yes. |
|   | 4 ml. 37% HCHO plus NaOH to pH 5.6 | 4 | Yes. |
|   | 4 ml. 37% HCHO plus Ca(OH)₂ to pH 4.6 | 3 | Slight. |
|   | 4 ml. 37% HCHO plus Ca(OH)₂ to pH 5.6 | 3 | Do. |
| 5 | None | 7 | Excessive. |
|   | 4 ml. 37% HCHO plus 0.7 g. NaOH | 3 | Slight. |

It can be seen from the above table that in every case there was less color after heating in the treated samples than in the untreated samples and thus a correspondingly decreased tendency to cake upon storage for any considerable period of time.

The effect noted in the table above is a cumulative one brought about through the addition of both formaldehyde and a hydroxide, though each of these additives when added alone does produce a product having less tendency to cake than a wholly untreated product. This can be seen by reference to the following table in which the experiments reported were conducted in the manner described for the investigations reported in Table II.

TABLE III

*Caking of treated and untreated feed supplements*

| Additives per 100 grams of syrup | Color after heat | Caking |
|---|---|---|
| None | 6 | Excessive. |
| 0.7 g. NaOH | 5 | Severe. |
| 4 ml. 37% formaldehyde | 4 | Slight. |
| 4 ml. 37% formaldehyde plus 0.7 g. NaOH | 3 | Very slight. |

It can be seen from the above table that the tendency to cake is decreased by the addition of one or the other of the two cake-preventing additives but that the effect is even more pronounced when both of the additives are included in the feed supplement composition.

The addition of the formaldehyde and hydroxide does not destroy the vital growth promoting ingredients contained in the feed supplement and the following table is presented to show the lack of harmful effects upon addition of the cake-preventing additives. The table shows the riboflavin assay of feed supplement before and after the addition of formaldehyde and/or sodium hydroxide or calcium hydroxide. In each case it can be seen that there is no significant difference between the assays before and after the addition of the cake-preventing ingredient:

TABLE IV

*Riboflavin assay of treated and untreated feed supplements*

| Lot No. | 37% HCHO | NaOH or Ca(OH)₂ | Assay, micrograms/gram |
|---|---|---|---|
| 1 | None | None | 16,792 |
|   | 4.62 | 0.6 | 16,694 |
|   | 1.85 | 0.6 | 16,645 |
|   | 4.62 | None | 16,716 |
| 2 | None | None | 20,005 |
|   | 1.85 | 0.35 | 21,789 |
|   | 1.85 | 0.7 | 20,859 |
| 3 | None | None | 17,397 |
|   | 1.85 | 0.7 | 17,627 |

The above table indicates that there is no decrease in the riboflavin content of the feed supplement upon addition of the cake-preventing ingredients formaldehyde and an alkali metal or an alkaline earth metal hydroxide. Therefore there is no sacrifice in efficiency by addition of the cake-preventing ingredients and thus a feed supplement manufacturer does not have to balance any loss due to storage with a loss due to cake-preventing means.

In addition to the information reported in the above table, further indication of the efficacy of treated feed is shown in the results obtained in chick feeding tests. A series of experiments was conducted where separate lots of day old White-Rock chicks were fed for 29 days on a basal ration which was not deficient in riboflavin content, the same basal ration supplemented with one gram per pound of a feed supplement consisting of dried fermentation residues resulting from the culture of the organism *Eremothecium ashbyii* on nutrient media and the same basal ration supplemented with both 142 milligrams and 1 gram per pound of dried fermentation residue obtained from the culture liquor resulting from the fermentation of nutrient media utilizing the organism *Eremothecium ashbyii* and treated with 1.85 grams of a 37% solution of formaldehyde and 0.7 gram of sodium hydroxide per 100 grams of partially evaporated fermentation liquor containing about 30% solids. The following table shows the results of the experiment wherein the weight of the chicks is an average of 20 chicks per test and the "feed efficiency" may be defined as the number of grams of feed required to produce a one gram increase in weight per chick.

TABLE V

*Chick feeding tests*

| Lot No. | Supplement | Weight, grams | Feed efficiency |
|---|---|---|---|
| 1 | None | 175 | 3.21 |
| 2 | 142 mg. untreated supp./pound of feed | 189 | 3.02 |
| 3 | 142 mg. treated supp./pound of feed | 169 | 3.15 |
| 4 | 1 g. untreated supp./pound of feed | 179 | 3.08 |
| 5 | 1 g. treated supp./pound of feed | 190 | 2.93 |

It can be seen from the data presented in the above table, that treatment of the feed supplement with formaldehyde and sodium hydroxide has neither a depressive nor a stimulating effect on chicks as compared to the untreated material. Furthermore, neither the formaldehyde nor the hydroxide when added together or when added alone have any ill effects on the animals being fed the rations containing the treated feed supplements. Mouse toxicity tests were conducted on a material containing 4.62 grams of formaldehyde and 0.6 gram sodium hydroxide per 100 grams partially evaporated fermentation liquor containing 30% solids resulting from the culture of the organism *Eremothecium ashbyii* on a nutrient media, on a similar material containing 4.62 grams of formaldehyde and no sodium hydroxide and on a material containing no formaldehyde but with 0.6 gram of sodium hydroxide present. In all of the tests conducted, the maximum amount of the feed supplement which could be fed to the mice without the occurrence of any deaths was in excess of 5,000 milligrams per kilogram of body weight of the test mice. Thus the treated feed supplement can be said to be non-toxic.

I do not intend for my invention to be limited to dried residues resulting from fermentation of nutrient media utilizing the organism *Eremothecium ashbyii* but I intend to include all other feed supplements consisting of dried fermentation residues in which the essential growth promoting ingredients such as vitamins, proteins, etc., are not inactivated by the formaldehyde and/or the alkali metal or the alkaline earth metal hydroxide. Thus I intend for dried residues resulting from the fermentation of nutrient media utilizing the organisms *Clostridium acetobutylicum*, *Clostridium roseum*, *Clostridium saccharoacetobutylicum*, *Clostridium inverto acetobutylicum*, *Clostridium saccharo-butyl-acetonicum-liquiefaciens*, etc. to be specifically included within the scope of my invention. In addition I intend for all other equivalents and variants apparent to those skilled in the art to be specifically included within the scope of my invention.

Now having described my invention what I claim is:

1. A dry, non-caking, fermentation residue feed supplement to which formaldehyde and a material selected from the group consisting of alkali metal hydroxides and alkaline earth metal hydroxides have been added following the substantial evaporation of water but prior to final drying.

2. A non-caking feed supplement consisting of dried residues from the evaporation of aqueous fermentation liquors resulting from the culture of the organism *Eremothecium ashbyii* on a nutrient medium to which formaldehyde and a compound selected from the group consisting of an alkali metal hydroxide and an alkaline earth metal hydroxide have been added following substantial evaporation of water but prior to final drying.

3. A non-caking feed supplement consisting of dried residues from the evaporation of aqueous fermentation liquors to which have been added following partial evaporation from about 1 to about 5 parts of formaldehyde per 100 parts of the partially dried material and a sufficient amount of a compound selected from the group consisting of an alkali metal hydroxide and an alkaline earth metal hydroxide to bring the pH of the partially dried material to a value between about 3.5 and 6.5.

4. A non-caking feed supplement consisting of the dried residues from the evaporation of aqueous fermentation liquors resulting from the culture of the organism *Eremothecium ashbyii* on nutrient media to which have been added following partial evaporation from about 1 to about 5 parts of formaldehyde per 100 parts of the partially dried material and a sufficient amount of a compound selected from the group consisting of an alkali metal hydroxide and an alkaline earth metal hydroxide to bring the pH of the partially dried material to a value between about 3.5 and 6.5.

5. A non-caking feed supplement of high riboflavin content consisting of a dried residue from the evaporation of aqueous fermentation liquors resulting from the culture of the organism *Eremothecium ashbyii* on nutrient media to which have been added following partial evaporation from about 1 to about 5 parts of formaldehyde per 100 parts of the partially dried material and a sufficient amount of sodium hydroxide to bring the pH of the partially dried material to a value between about 3.5 and 6.5.

6. A non-caking feed supplement consisting of a dried residue from the evaporation of aqueous fermentation liquors resulting from the culture of the organism *Eremothecium ashbyii* on nutrient media to which have been added following evaporation to about a 30% solids content about 2 parts of formaldehyde per 100 parts of the partially dried material and a sufficient amount of sodium hydroxide to bring the pH of the partially dried material to a value of about 5.5.

7. A process for the production of a non-caking feed supplement which comprises partially evaporating liquors from a fermentation culture broth, adding from about 1 to about 5 parts of formaldehyde per 100 parts of the partially dried material, adjusting the pH of the partially dried material to a value between about 3.5 and 5.5 with a compound selected from the group consisting of an alkali metal hydroxide and an alkaline earth metal hydroxide, and drying the resulting mixture until the material is free flowing when ground.

8. A process for the production of a non-caking feed supplement of high riboflavin content which comprises partially evaporating fermentation liquors resulting from the culture of the organism *Eremothecium ashbyii* on nutrient media, adding from about 1 to about 5 parts of formaldehyde per 100 parts of partially dried material, adjusting the pH of the partially dried material to a value between about 3.5 and 5.5 with a compound selected from the group consisting of an alkali metal hydroxide and an alkaline earth metal hydroxide, and drying the resulting mixture until the material is free-flowing when ground.

9. A process for the production of a non-caking feed supplement of high riboflavin content which comprises evaporating fermentation liquors resulting from a culture of the organism *Eremothecium ashbyii* on nutrient media to about a 30% solids content, adding about 2 parts formaldehyde per 100 parts of a partially dried material, adjusting the pH of the partially dried material to a value of about 5.5 with sodium hydroxide and drying the resulting mixture until the material is free-flowing when ground.

JOHN W. BRODHACKER.

References Cited in the file of this patent

UNITED STATES PATENTS

| Number | Name | Date |
|---|---|---|
| 218,159 | Campbell | Aug. 5, 1879 |
| 345,987 | Parks | July 20, 1886 |
| 1,807,043 | Maybee | May 26, 1931 |
| 2,067,002 | Pollard | Jan. 5, 1937 |
| 2,449,143 | Pollard | Sept. 14, 1948 |